Patented Dec. 23, 1947

2,433,168

UNITED STATES PATENT OFFICE 2,433,168

BINDER FOR MOLD COMPOSITIONS

Hans Staeger, Zurich, Switzerland, assignor to the Swiss society: Gesellschaft zur Förderung der Forschung auf dem Gebiete der technischen Physik an der Eidg. Technischen Hochschule G. T. P., Zurich, Switzerland No Drawing. Application January 11, 1943, Serial No. 472,066. In Switzerland January 29, 1942

6 Claims. (Cl. 22—188)

This invention is concerned with novel sand molds for the casting of metals, and particularly with new binding agents for making such molds. It comprises the molding compositions containing such binders, the molds themselves, and the processes for their manufacture.

In the manufacture of sand molds, especially also in the manufacture of cores for thin-walled castings, it has previously been usual to add small quantities of binding agents, such as linseed oil, dextrine, molasses, sulfite waste liquor, etc., to the molding sand and, after the manufacture of the casting molds, especially in the case of cores, to treat the latter at a temperature high enough to ensure a solidification of the sand mold by the binding agent by reason of the drying which takes place.

It has already been suggested to make use of artificial resins, for example, alkyd resins, phenolic resins, etc., as binding agents for the purpose named, but it has as yet proved impossible to make technically useful sand molds on this basis. The main reason for the failure of this process has been the formation of slight incrustations on the surface of the casting giving it a matt, dull appearance. Furthermore, the cores obtained by use of these resins are in many cases insufficiently solid.

It has now been found in a surprising manner that binding agents containing aldehyde condensation products of aminotriazines are exceptionally suitable for the manufacture of sand molds, especially cores.

It is preferable to add to the binding agent other substances which increase the elasticity, plasticity, and solidity of the molds, more especially the cores. Such substances are, for example, dextrine, sulfite waste liquor, cherry kernel gum, grapeseed oil, etc.

Additions which have been shown to be especially valuable are those which contain aldehyde condensation products of carbamides, particularly urea. In place of a special addition of carbamide resin to the aminotriazine resin, mixed resins can be used which have been prepared by either separate or common condensation of aminotriazines and carbamides with formaldehyde.

The mixture of the condensation products or of the binding agents containing these condensation products with the molding sand is preferably carried out by simple addition of these substances in powder form. In order to increase the plasticity of the molding sand to which the binding agent has been added, it may prove advisable to add a small quantity of water to the former.

The quantity of the aminotriazine-aldehyde condensation product used can vary within fairly wide limits. In many cases, one per cent by volume may prove to be sufficient. In other cases it may prove advisable to increase this quantity to several per cent by volume. The quantities of the additions which may be necessary vary, in general, within similar limits to those of the aminotriazine condensation products themselves. Sand molds which contain the new binding agents, and, if desired, other additions, in the quantities mentioned become very solid after having been aftertreated, either at room temperature or at raised temperatures and can be used for molding directly, without further baking. The solidification of the molding sand to which the binding agents mentioned have been added is due to the hardening of the condensation products. In order that this hardening may take place at low temperatures within a short time it is advisable to add to the binding agents either acids or acid-liberating agents, such as formic acid, phosphoric acid, ammonium salts of strong acids, etc.

It has further proved advisable to remove or bind any water which may have been added to assist plasticity, or which may have been liberated by the condensation products during the hardening process, from the sand molds before casting. This can be done by adding substances which are capable of binding water by physical or chemical means, such as phosphorus pentoxide or silica gel. In the first case, the effect is attained whereby an acid formation takes place simultaneously with the binding of the water, which, as stated above, causes a desirable acceleration of the hardening process. Naturally, for this purpose, basic substances do not come into consideration, as otherwise a reaction can take place at the casting temperature between certain components of the molding sand and the added substances, which would lead to a reduction of the stability towards heat of the molding sand.

Finally, the finished, hardened mold can be blackleaded in known manner with graphite.

As compared with the known sand molds especially those which are prepared with the help of linseed oil as binding agent, the molds obtained by the present invention offer the following advantages:

The core boxes need not be painted with water color, as is sometimes necessary, and can therefore be put into use much more rapidly. Work can be carried out with cold sand, which preserves the core boxes. The core does not soften in the oven, retains its shape completely even when heated for a considerable time (16 hours at 200° C.), and in no way alters in size.

The blacking can be carried out immediately the mold is unpacked, as the new core binding agent, contrary to linseed oil, is not water-repellent. As soon as the blacklead has dried, the liquid metal can be poured in without the necessity of a previous baking treatment. The permeability to gases of the cores prepared with the new binding agent is greater than that of cores bound with linseed oil. The surface of the finished casting is very clean and requires very little cleansing. Since the binder of the mold is decomposed by the heat of the molten metal the mold disintegrates so that the sand may be very easily removed from the surface of the cast metal.

Further, it may be quite generally mentioned that use of the binding agent in powder form permits appreciably cleaner working than is the case with the more or less sticky linseed oil. In addition, the synthetically prepared binding agents are much more regular in their properties than linseed oil which, as a natural product, is much more dependent on the result of the crop and can exhibit very different degrees of oxidation, by reason of which its behavior can vary within wide limits.

Among the aldehyde condensation products of amino-triazines, those which are especially suitable for the purposes of the present invention are the melamine-formaldehyde condensation products, for example, the still water-soluble or hydrophilic condensation products described in U. S. Patent No. 2,318,121, but naturally other aldehyde condensation products of the aminotriazine series can be used with advantage (compare, for example, U. S. Patents Nos. 2,310,004 and 2,197,357).

The following examples explain the invention without in any way restricting it. The method of working can vary fairly extensively according to the case in point. The parts mentioned in the examples are parts by volume.

*Example 1*

The following sand mixture is made up:
100 parts of pure quartz sand with a water content of 2 per cent by volume are mixed in a suitable core sand mixing machine with about 2.8–3.3 parts of a dry, ground, water soluble, hardenable melamine-formaldehyde condensation product, prepared according to Example 1 of U. S. Patent No. 2,318,121, about 2.5 parts of a dry, ground, still water-soluble, hardenable urea-formaldehyde condensation product, and about 0.72 part of formic acid of 85 per cent strength.

The addition of the condensation products takes place straight away; that of the formic acid is made only when the mixture has been running for about 7 minutes. The total mixing time amounts to about 9–10 minutes. The mass is now ready for the preparation of the casting mold. Further working up takes place as for the preparation of a core, using linseed oil as binding agent. However, hardening of the mold can take place at ordinary temperature. If desired it may be accelerated by baking the mold in the oven at 200–220° C.

Further mixings are given in the following examples. These are worked up as described in Example 1.

*Example 2*

| | Parts |
|---|---|
| Quartz sand | 100 |
| The melamine-formaldehyde condensation product described in Example 1 | 4 |
| Concentrated acetic acid | 0.4 |
| Water | 1.4 | are mixed as described in Example 1. The mixture is hardened either for a short time in the oven at 200–220° C. or for a longer time in the air at ordinary temperature.

*Example 3*

| | Parts |
|---|---|
| Quartz sand | 100 |
| The melamine-formaldehyde condensation product described in Example 1 | 1 |
| Dextrine | 1 |
| Formic acid of 85 per cent strength | 0.24 |
| Water | 1.2 | are mixed as described in Example 1. The mixture is hardened either in the oven at 200–220° C. or at ordinary temperature.

The following examples explain the use of dehydrating additions:

*Example 4*

| | Parts |
|---|---|
| Quartz sand | 100 |
| The melamine-formaldehyde condensation product described in Example 1 | 1.5 |
| The urea-formaldehyde condensation product described in Example 1 | 1 |
| Phosphorus pentoxide | 0.25 |
| Water | 1.3 | are worked up as described in Example 1. Hardening is carried out at ordinary temperature.

*Example 5*

| | Parts |
|---|---|
| Quartz sand | 100 |
| The melamine-formaldehyde condensation product described in Example 1 | 1.5 |
| The urea-formaldehyde condensation product described in Example 1 | 1 |
| Formic acid of 85 per cent strength | 0.25 |
| Silica gel | 0.25 |
| Water | 1.2 | are worked up as described in Example 1. Hardening takes place at ordinary temperature in the air.

What I claim is:

1. A process for the manufacture of a sand mold which sets in the cold and is particularly adapted for use in casting metals, which comprises mixing a major proportion of sand with about 1 to about 6 per cent, by weight relative to the weight of said sand, of a binder which contains, as a major constituent, a melamine-formaldehyde condensation product and as a further constituent a substantial proportion of a urea-formaldehyde condensation product, and with a minor proportion of a hardening agent of weak acid nature for said binder, then molding the resultant mixture to desired shape and allowing the mold to set substantially without external heat.

2. A process for the manufacture of a sand mold which sets in the cold and is particularly adapted for use in casting metals, which comprises mixing a major proportion of sand with about 1 to about 6 per cent, by weight relative to the weight of said sand, of a binder which contains, as a major constituent, a melamine-formaldehyde condensation product and as a further constituent a substantial proportion of a urea-formaldehyde condensation product, and with a minor proportion of formic acid as hardening agent for said binder, then molding the resultant mixture to desired shape and allowing the mold to set substantially without external heat.

3. A molding composition capable of setting in the cold and particularly suitable for use in casting metals, which comprises an intimate admixture of a major proportion of sand with about 1 to about 6 per cent by weight relative to the weight of said sand, of a binder which contains a melamine-formaldehyde condensation product as a major constituent and a substantial proportion of urea-formaldehyde condensation product as a further constituent, and with a minor proportion of a hardening agent of weak acid nature for said binder.

4. A molding composition capable of setting in the cold and particularly suitable for use in casting metals, which comprises an intimate admixture of a major proportion of sand with about 1 to about 6 per cent, by weight relative to the weight of said sand, of a binder which contains a melamine-formaldehyde condensation product as a major constituent and a substantial proportion of urea-formaldehyde condensation product as a further constituent, and with a minor proportion of formic acid as hardening agent for said binder.

5. A mold for use in casting metals, which comprises a cold set intimate admixture of a major proportion of sand with about 1 to about 6 per cent, by weight relative to the weight of said sand, of a binder which contains a melamine-formaldehyde condensation product as a major constituent and a substantial proportion of urea-formaldehyde condensation product as a further constituent, and with a minor proportion of a hardening agent of weak acid nature for said binder.

6. A mold for use in casting metals, which comprises a cold set intimate admixture of a major proportion of sand with about 1 to about 6 per cent, by weight relative to the weight of said sand, of a binder which contains a melamine-formaldehyde condensation product as a major constituent and a substantial proportion of urea-formaldehyde condensation product as a further constituent, and with a minor proportion of formic acid as hardening agent for said binder.

HANS STAEGER.

REFERENCES CITED

The following references are of record in the file of this patent:

UNITED STATES PATENTS

| Number | Name | Date |
|---|---|---|
| 1,482,358 | Ellis | Jan. 29, 1924 |
| 2,197,357 | Widmer | Apr. 16, 1940 |
| 2,148,642 | Ricard | Feb. 28, 1939 |
| 2,199,803 | Light | May 7, 1940 |
| 2,318,121 | Widmer | May 4, 1943 |
| 2,310,004 | Widmer | Feb. 2, 1943 |